US010535888B2

(12) United States Patent
Nakano et al.

(10) Patent No.: US 10,535,888 B2
(45) Date of Patent: Jan. 14, 2020

(54) MEMBRANE ELECTRODE ASSEMBLY, ELECTROCHEMICAL CELL, STACK, FUEL CELL, AND VEHICLE

(71) Applicant: Kabushiki Kaisha Toshiba, Minato-ku (JP)

(72) Inventors: Yoshihiko Nakano, Yokohama (JP); Wu Mei, Yokohama (JP); Taishi Fukazawa, Meguro (JP); Yuta Kanai, Fuchu (JP); Hiroki Hiraga, Saitama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 183 days.

(21) Appl. No.: 15/706,111

(22) Filed: Sep. 15, 2017

(65) Prior Publication Data

US 2018/0277871 A1 Sep. 27, 2018

(30) Foreign Application Priority Data

Mar. 22, 2017 (JP) ................................. 2017-056695
Sep. 13, 2017 (JP) ................................. 2017-175596

(51) Int. Cl.
*H01M 8/1004* (2016.01)
*H01M 8/241* (2016.01)
*H01M 4/86* (2006.01)

(52) U.S. Cl.
CPC ....... *H01M 8/1004* (2013.01); *H01M 4/8626* (2013.01); *H01M 8/241* (2013.01); *H01M 2250/20* (2013.01)

(58) Field of Classification Search
CPC .... H01M 4/8626; H01M 4/8657; H01M 4/92; H01M 8/1004; H01M 8/1016; H01M 2008/1095; H01M 8/241
See application file for complete search history.

(56) References Cited

U.S. PATENT DOCUMENTS

| | | | | |
|---|---|---|---|---|
| 6,300,000 | B1 * | 10/2001 | Cavalca | H01M 4/8642 |
| | | | | 429/480 |
| 7,141,328 | B2 | 11/2006 | Fukumoto et al. | |
| 8,758,959 | B2 | 6/2014 | Mei et al. | |
| 10,249,898 | B2 * | 4/2019 | Mei | H01M 8/1004 |
| 2002/0004159 | A1 * | 1/2002 | Totsuka | H01M 4/86 |
| | | | | 427/115 |
| 2002/0136939 | A1 * | 9/2002 | Grieve | H01M 8/04089 |
| | | | | 429/415 |
| 2003/0044672 | A1 * | 3/2003 | Fukumoto | H01M 4/8605 |
| | | | | 429/485 |
| 2005/0142433 | A1 | 6/2005 | Ueda et al. | |
| 2006/0057281 | A1 * | 3/2006 | Izumi | H01M 4/8605 |
| | | | | 427/115 |
| 2009/0011312 | A1 * | 1/2009 | Son | H01M 8/04201 |
| | | | | 429/410 |
| 2009/0017353 | A1 * | 1/2009 | Yoshida | H01M 8/04067 |
| | | | | 429/492 |
| 2009/0068530 | A1 | 3/2009 | Hiraoka et al. | |
| 2010/0234210 | A1 * | 9/2010 | Kawamura | H01M 4/9041 |
| | | | | 502/101 |
| 2010/0248087 | A1 | 9/2010 | Tsuji et al. | |
| 2011/0024294 | A1 * | 2/2011 | Jeng | B82Y 30/00 |
| | | | | 204/471 |
| 2012/0251915 | A1 | 10/2012 | Mei et al. | |
| 2013/0078549 | A1 | 3/2013 | Fukazawa et al. | |

FOREIGN PATENT DOCUMENTS

| | | |
|---|---|---|
| JP | 2002-075382 | 3/2002 |
| JP | 2005-190780 | 7/2005 |
| JP | 2008-226722 | 9/2008 |
| JP | 2009-199877 | 9/2009 |
| JP | 2010-033759 | 2/2010 |
| JP | 4519375 | 8/2010 |
| JP | 2012-204221 | 10/2012 |
| JP | 2013-073695 | 4/2013 |
| JP | 5284980 | 9/2013 |
| JP | 5342824 | 11/2013 |
| JP | 2015-065183 | 4/2015 |
| JP | 2015-109281 | 6/2015 |
| JP | 5829586 | 12/2015 |
| JP | 5880669 | 3/2016 |
| WO | 2006/123529 | 11/2006 |

* cited by examiner

*Primary Examiner* — Anca Eoff
(74) *Attorney, Agent, or Firm* — Oblon, McClelland, Maier & Neustadt, L.L.P.

(57) ABSTRACT

A membrane electrode assembly of an embodiment includes: a first electrode having a first base, and a first catalyst layer provided on the first base, the first catalyst layer including a plurality of first catalyst units with a laminated structure, and the laminated structure including void layers; and an electrolyte membrane being in direct contact with both first surfaces of the first catalyst units facing each other among the first catalyst units, and second surfaces of the first catalyst units on the opposite side from the first base side. A portion is included where the electrolyte membrane exists over a region being at least 80% of a thickness of the first catalyst layer from the second surfaces of the first catalyst units toward the first base.

18 Claims, 9 Drawing Sheets

MEMBRANE ELECTRODE ASSEMBLY, ELECTROCHEMICAL CELL, STACK, FUEL CELL, AND VEHICLE

CROSS-REFERENCE TO RELATED APPLICATION

This application is based upon and claims the benefit of priority from Japanese Patent Applications No. 2017-056695, filed on Mar. 22, 2017 and No. 2017-175596, filed on Sep. 13, 2017; the entire contents of which are incorporated herein by reference.

FIELD

Embodiments described herein relate to a membrane electrode assembly, an electrochemical cell, a stack, a fuel cell, and a vehicle.

BACKGROUND

In recent years, electrochemical cells have been studied actively. Of the electrochemical cells, for example, a fuel cell includes a system for causing electrochemical reaction between a fuel such as hydrogen and an oxidant such as oxygen to generate electric power. Above all, a polymer electrolyte membrane fuel cell (PEFC) applies a light load to the environment and has thus been put into an active use as a household stationary power source or an automotive power source. As a catalyst layer included in each electrode of the PEFC, a carbon-supported catalyst, obtained by supporting a catalyst material on a carbon black support, is in general use. Due to power generation of the fuel cell, the carbon support corrodes to cause great degradation of the carbon layer and a membrane electrode assembly (MEA) including the catalyst layer, and a large amount of catalyst is thus in use for ensuring the durability of the fuel cell. One big challenge for widespread use of PEFCs is to decrease an amount of usage of the noble metal catalyst, so as to reduce cost.

In the fuel cell, for avoiding the degradation of the catalyst caused by the carbon support and enhancing the catalyst activity and the characteristics of the electrochemical cell, a support-less porous catalyst layer has been proposed, and even a small amount of platinum has been able to ensure excellent durability and excellent characteristics.

Meanwhile, since the electrolyte membrane used in the electrochemical cell has been very expensive, the membrane electrode assembly also costs high, which has generally been a big problem in widespread use. Further, for improving the performance of the electrochemical cell, generally, the thickness of the electrolyte membrane has been decreased to reduce the membrane resistance. However, it is known that in the electrolyte membrane sandwiched between the electrodes, large mechanical stress due to swelling and contraction of the electrode ends caused by moisture fluctuations therein is applied to the electrolyte membrane portion outside the electrodes and the electrolyte membrane portion sandwiched between the electrodes, and hence cracking in the membrane and the like easily occur. As described above, the MEA cannot be said to have been developed sufficiently, and needs further improvement.

DETAILED DESCRIPTION

A membrane electrode assembly of an embodiment includes: a first electrode having a first base, and a first catalyst layer provided on the first base, the first catalyst layer including a plurality of first catalyst units with a laminated structure, and the laminated structure including void layers; and an electrolyte membrane being in direct contact with both first surfaces of the first catalyst units facing each other among the first catalyst units, and second surfaces of the first catalyst units on the opposite side from the first base side. A portion is included where the electrolyte membrane exists over a region being at least 80% of a thickness of the first catalyst layer from the second surfaces of the first catalyst units toward the first base.

Hereinafter, details of embodiments of the invention will be described with reference to the drawings. Note that in the following description, the same member or the like will be provided with the same numeral, and a repeated description of the once described member or the like will be omitted appropriately.

First Embodiment

A membrane electrode assembly (MEA) of a first embodiment includes: a first electrode having a first base, and a first catalyst layer provided on the first base and including a plurality of first catalyst units with a laminated structure including void layers; and an electrolyte membrane being in direct contact with both surfaces (first surfaces) of the first catalyst units facing each other among the first catalyst units, and surfaces (second surfaces) of the first catalyst units on the opposite side from first base side. The MEA includes a portion where the electrolyte membrane exists over a region being at least 80% of a thickness of the first catalyst layer from the surfaces of the first catalyst units, which are in direct contact with the electrolyte membrane on the opposite side from the first base side, toward the first base.

Figure 1:
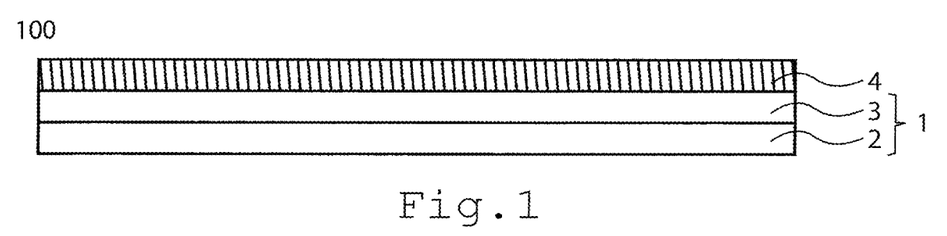
FIG. 1 is a sectional view of a gas diffusion electrode with an electrolyte (layer) according to an embodiment.

FIG. 1 shows a sectional view of a membrane electrode assembly (MEA) 100 (a sectional view of a gas diffusion electrode with an electrolyte (layer)) of the first embodiment. The MEA 100 of FIG. 1 has a first electrode 1 including a first base 2 and a first catalyst layer 3, and an electrolyte membrane 4.

When the MEA 100 is used for a fuel cell, electrodes on both sides are respectively an anode and a cathode. Hydrogen is supplied to the anode, and an air is supplied to the cathode.

In the first electrode 1, the first catalyst layer 3 is provided on the first base 2. The first catalyst layer 3 in the first electrode 1 is in direct contact with the electrolyte membrane 4. The contact in the embodiment is preferably direct contact.

The first base 2 is a substrate that holds the first catalyst layer 3. The first base 2 is a so-called gas diffusion base typically required to have porosity and conductivity. A layered matter of a titanium material or a carbon material is typically employed. The form of the first base 2 is not particularly restricted, but a mesh, a cloth made of fibers, a titanium sintered compact, and the like can be cited. Water electrolysis characteristics may be improved by adjustment of an aperture ratio of a porous substrate, especially a porous structure of a portion indirect contact with the first catalyst layer 3, or by surface treatment on the substrate, such as blast treatment. This is considered to be because the water supply to the first catalyst layer 3, the discharge of an electrode reaction product, and the like become smooth to promote the electrode reaction in the first catalyst layer 3. Another coating layer may be provided on the substrate. The durability of the electrode may be greatly improved by a dense coating layer having conductivity. The coating layer is not particularly restricted, but a metal material, an oxide or nitride ceramic material, carbon, or the like, can be used.

The first base 2 often includes a water repellent in order to prevent occurrence of water clogging, so called, a flooding phenomenon. The water repellent in the first base 2 is a fluorine-based polymer material, such as polytetrafluoroethylene (PTFE), polyvinylidene fluoride (PVdF), or polyhexafluoropropene, tetrafluoroethylene-hexafluoropropene copolymer (FEP). A favorable first base 2 is a laminate of a porous carbon layer and a carbon substrate, and the first catalyst layer 3 is provided on the porous carbon layer side.

The first catalyst layer 3 includes a plurality of catalyst units provided on the first base 2. The first catalyst layer 3 is a support-less porous catalyst layer. A catalyst layer used for an electrochemical cell is typically made up of a supported catalyst formed by taking a material such as carbon as a support and making the catalyst supported on the surface of the support, so as to obtain excellent cell characteristics. The support material is hardly contributed to main electrode catalyst reaction. However, it has been reported that the support material can make control on the catalyst material, such as improvement in reactive area of the catalyst material, and by the form of the electrochemical cell, the support material can improve the porous structure, electrical conductivity, ionic conductivity, and the like. "Support-less" means that the support is not used in the catalyst constituting the first catalyst layer. That is, the first catalyst layer 3 is made of the catalyst material. Specifically, the first catalyst layer 3 includes catalyst units with a porous structure or catalyst units with a laminated structure including void layers. When a noble metal catalyst is used, even when its amount used is small, it is possible to maintain excellent characteristics and high durability of the electrochemical cell.

Figure 2A:
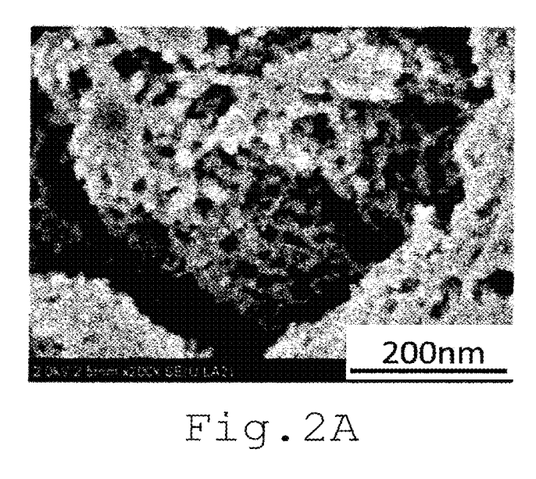
FIGS. 2A, 2B, 2C and 2D are each a low-magnification transmission photomicrograph of a cross section of a laminated catalyst according to the embodiment.
Figure 2B:
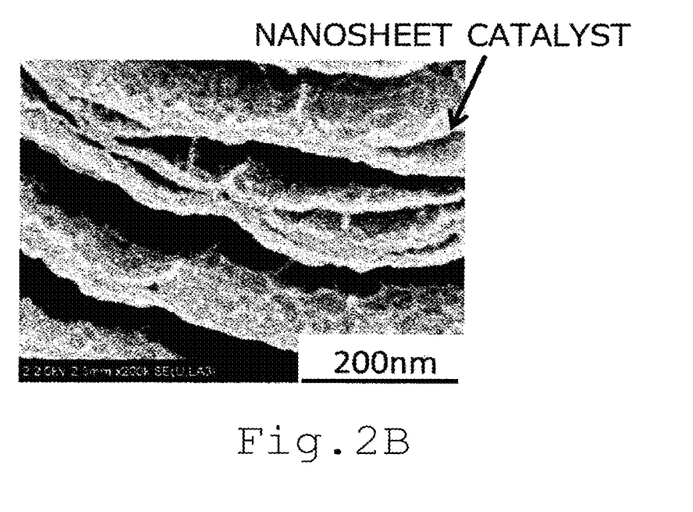

FIGS. 2A and 2B respectively show low-magnification transmission photomicrographs of catalyst units with a porous structure and catalyst units with a laminated structure including void layers. FIG. 2A shows catalyst units with a porous structure, and FIG. 2B shows catalyst units with a laminated structure including void layers. In the case of the catalyst material being supported on a support, the catalyst is typically in a nano-sized particulate form, whereas in the case of the catalyst units with the porous structure, the catalyst itself is in a spongy form. In the case of the catalyst units with the laminated structure including void layers, the catalyst is in a nanosheet form. Using the catalyst in the spongy form or the nanosheet form enables improvement in characteristics of the electrochemical cell.

Since the electrode catalyst reaction occurs on the surface of the catalyst, the shape of the catalyst has an effect on atomic arrangement and an electronic state on the surface of the catalyst. In the case of the catalyst units with the laminated structure including the void layers, it is desirable to partially integrate the adjacent nanosheets. This is because, such partial integration is considered to enable smoother achievement of proton conduction or hydrogen-atom conduction for the electrode reaction, although its mechanism has not been clarified completely.

Figure 2C:
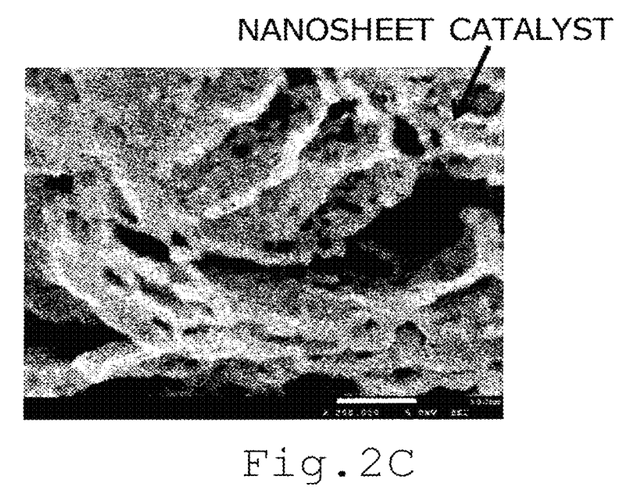
Figure 2D:
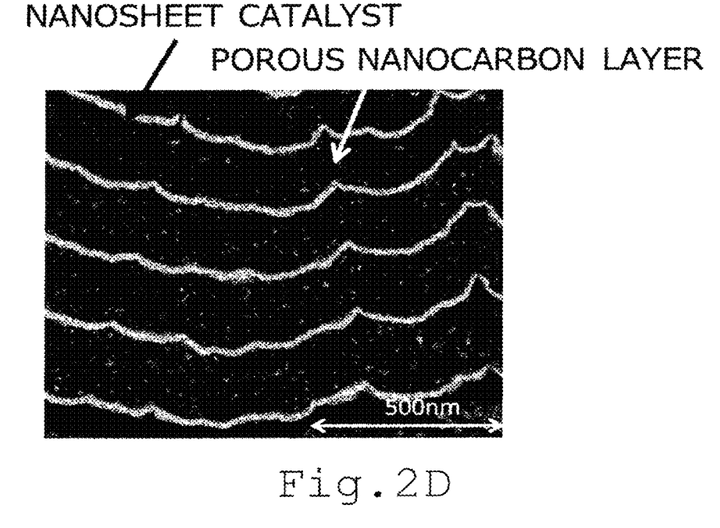

Further, as shown in a low-magnification transmission photomicrograph of FIG. 2C, the nanosheets inside the laminated structure are made porous to obtain more excellent characteristics. This is because gas diffusion and water management can be improved. The durability and the robustness can be improved more by disposing porous nanocarbon layers (a low-magnification transmission photomicrograph of FIG. 2D) including fibrous carbon, or nanoceramic material layers, between the nanosheets inside the laminated structure. Since the catalyst that contributes the main electrode reaction is hardly supported on fibrous carbon included in the porous nanocarbon layers, the units with the laminated structure including the porous nanocarbon layers are considered to be support-less. It is preferable here that a porosity of the catalyst layer be not less than 50 Vol. % and not more than 90 Vol. % so that movement of a material, such as discharge of moisture, becomes smoother. When the porosity of the catalyst layer is within this range, the material can be sufficiently moved without reducing the utilization efficiency of the noble metal.

A predetermined catalyst material employed for the support-less catalyst layer according to the present embodiment includes, for example, at least one selected from the group consisting of: noble metal elements such as Pt, Ru, Rh, Os, Ir, Pd, and Au. Such a catalyst material is excellent in catalyst activity, conductivity, and stability. The foregoing metals can also be used as an oxide, or may be used as a composite oxide or a mixed oxide containing two or more of the metals.

An optimum noble metal element can be appropriately selected in accordance with reaction in use of the MEA 100. For example, when the oxygen reduction reaction is necessary for the cathode of the fuel cell, a catalyst with a composition represented by $Pt_u M_{1-u}$ is desired. Here, u is $0 < u \leq 1$, an element M is at least one selected from the group consisting of: Co, Ni, Fe, Mn, Ta, W, Hf, Si, Mo, Ti, Zr, Nb, V, Cr, Al, and Sn. This catalyst contains not less than 0 atomic % and not more than 90 atomic % of Pt, and not less than 10 atomic % and less than 100 atomic % of the element M.

The electrolyte membrane 4 is a film required to have ionic conductivity. The electrolyte membrane 4 is in direct contact with the surfaces of the first catalyst units facing each other, and is in direct contact with the surfaces of the first catalyst units 31 on the opposite side from the first base 2 side. That is, the electrolyte membrane 4 is indirect contact with the surface of the first catalyst layer 3 on the opposite side from the first base 2 side, and exists among the first catalyst units. The electrolyte membrane 4 includes any one or more of electrolyte materials from the group consisting of: fluororesin having a sulfonate group, tungstic acid, and phosphotungstic acid. As the fluororesin having the sulfonate group, for example, Nafion (trademark, Du Pont), Flemion (trademark, Asahi Glass Co., Ltd.), and Aciplex (Asahi Kasei Corporation), or the like is preferably used. An inorganic material such as tungstic acid or phosphotungstic acid is also preferred as the electrolyte material. When the membrane electrode assembly 100 of the embodiment is to be used in water electrolysis, the electrolyte membrane 4 preferably contains anyone or more from the group consisting of: a hydrogen peroxide decomposer, a radical scavenger, and a reinforcing member, so as to prevent degradation of the membrane.

The thickness of the electrolyte membrane 4 can be appropriately decided in consideration of the characteristics of the MEA 100. From viewpoints of the strength, the solubility resistance, and the output characteristics of the MEA, the thickness of the electrolyte membrane 4 is preferably not smaller than 5 µm and not larger than 300 µm, and more preferably not smaller than 5 µm and not larger than 200 µm.

The electrolyte membrane 4 exists among the plurality of catalyst units in the first catalyst layer 3. When the electrolyte membrane 4 is formed on the first catalyst layer 3, the electrolyte membrane 4 may enter a shallow region of the first catalyst layer 3. As for the entry of the electrolyte membrane, in the embodiment, the electrolyte membrane 4 enters among the catalyst units as deeply as the first base 2 side, thus leading to reduction in resistance between the first catalyst layer 3 and the electrolyte membrane 4, and degradation of power generation performance.

Figure 3:
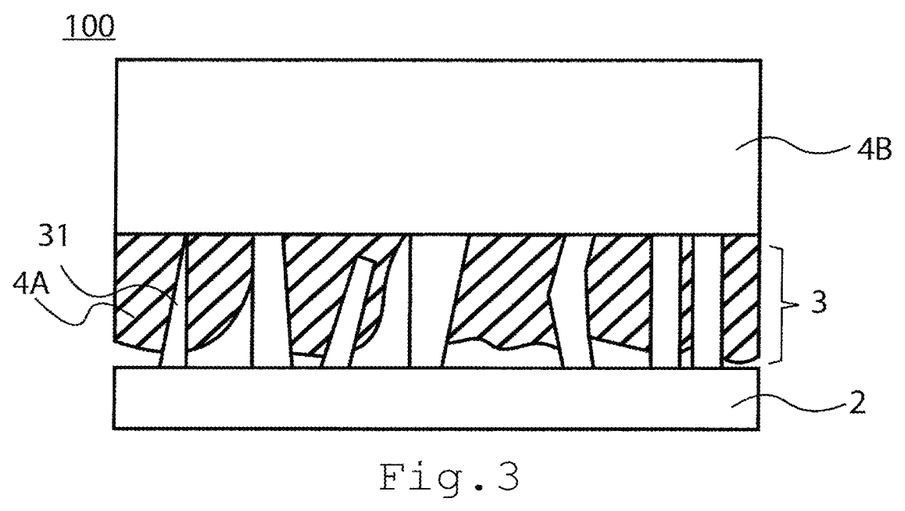
FIG. 3 is a sectional view of the gas diffusion electrode with the electrolyte (layer) according to the embodiment.

FIG. 3 shows an enlarged sectional view of the membrane electrode assembly 100 (a sectional view of the gas diffusion electrode with an electrolyte (layer)). The sectional view of FIG. 3 shows catalyst units 31 in the first catalyst layer 3. In the sectional view of FIG. 3, the electrolyte membrane existing among the catalyst units 31 in the first catalyst layer 3 is denoted as an electrolyte membrane 4A, and the electrolyte membrane in direct contact with the surfaces of the first catalyst units 31 on the opposite side from the first base 2 side is denoted as an electrolyte membrane 4B. The electrolyte membrane 4A existing among the catalyst units 31 exists as deeply as the first base 2 side, to contribute to resistance reduction between the catalyst units 31 and the electrolyte membrane 4.

It is preferable to include a portion where the electrolyte membrane 4A exists over a region being at least 80% of the thickness of the first catalyst layer 3 from the surfaces of the first catalyst units 31, which are in direct contact with the electrolyte membrane 4B on the opposite side from the first base 2 side, toward the first base 2. From the viewpoint of resistance reduction between the catalyst units 31 and the electrolyte membrane 4, it is more preferable to include a portion where the electrolyte membrane 4A exists over a region being at least 85% of the thickness of the first catalyst layer 3 from the surfaces of the first catalyst units 31, which are in direct contact with the electrolyte membrane 4B on the opposite side from the first base 2 side, toward the first base 2. It is further more preferable to include a portion where the electrolyte membrane 4A exists over a region being at least 90% of the thickness of the first catalyst layer 3 from the surfaces of the first catalyst units 31, which are in direct contact with the electrolyte membrane 4B on the opposite side from the first base 2 side, toward the first base 2.

It is preferable by a similar reason to the above that an average depth of the electrolyte membrane 4A existing among the catalyst units 31 in the first catalyst layer 3 be not less than 75% of the thickness of the first catalyst layer 3 from the surfaces of the first catalyst units 31, which are in direct contact with the electrolyte membrane 4B on the opposite side from the first base 2 side, toward the first base 2. The average depth of the electrolyte membrane 4A existing among the catalyst units 31 in the first catalyst layer 3 is an average value of depths (ratios with respect to the thickness of the first catalyst layer 3) of the electrolyte membrane 4A existing from the surfaces of the first catalyst units 31, which are in direct contact with the electrolyte membrane 4B on the opposite side from the first base 2 side, toward the first base 2. When the average depth of the electrolyte membrane 4A existing among the catalyst units 31 in the first catalyst layer 3 is less than 75%, the power generation performance degrades due to increased resistance of the interface between the catalyst layer and the electrolyte. It is then preferable that the average depth of the electrolyte membrane 4A existing among the catalyst units 31 in the first catalyst layer 3 be not less than 80% of the thickness of the first catalyst layer 3 from the surfaces of the first catalyst units 31, which are in direct contact with the electrolyte membrane 4B on the opposite side from the first base 2 side, toward the first base 2. It is further more preferable that the average depth of the electrolyte membrane 4A existing among the catalyst units 31 in the first catalyst layer 3 be not less than 85% of the thickness of the first catalyst layer 3 from the surfaces of the first catalyst units 31, which are in direct contact with the electrolyte membrane 4B on the opposite side from the first base 2 side, toward the first base 2.

It is preferable that the depth of the electrolyte membrane 4A existing among the first catalyst units 31 in the first catalyst layer 3 be kept as uniform as possible throughout the first catalyst layer 3. It is then preferable that in not less than 60% (a number-of-units ratio when two facing first catalyst units 31 are taken as one pair) of a space among the first catalyst units 31, the electrolyte membrane 4A among the first catalyst units 31 exist over a region being at least 80% of the thickness of the first catalyst layer 3 from the surfaces of the first catalyst units 31, which are in direct contact with the electrolyte membrane 4B on the opposite side from the first base 2 side, toward the first base 2. It is preferable that the electrolyte membrane 4A existing among the first catalyst units 31 in the first catalyst layer 3 is indirect contact with the electrolyte membrane 4B in direct contact with the surfaces of the first catalyst units 31 on the opposite side from the first base 2 side.

<Thickness of Support-less Catalyst Layer>

A method for measuring the "catalyst layer thickness" is as follows.

Figure 4:
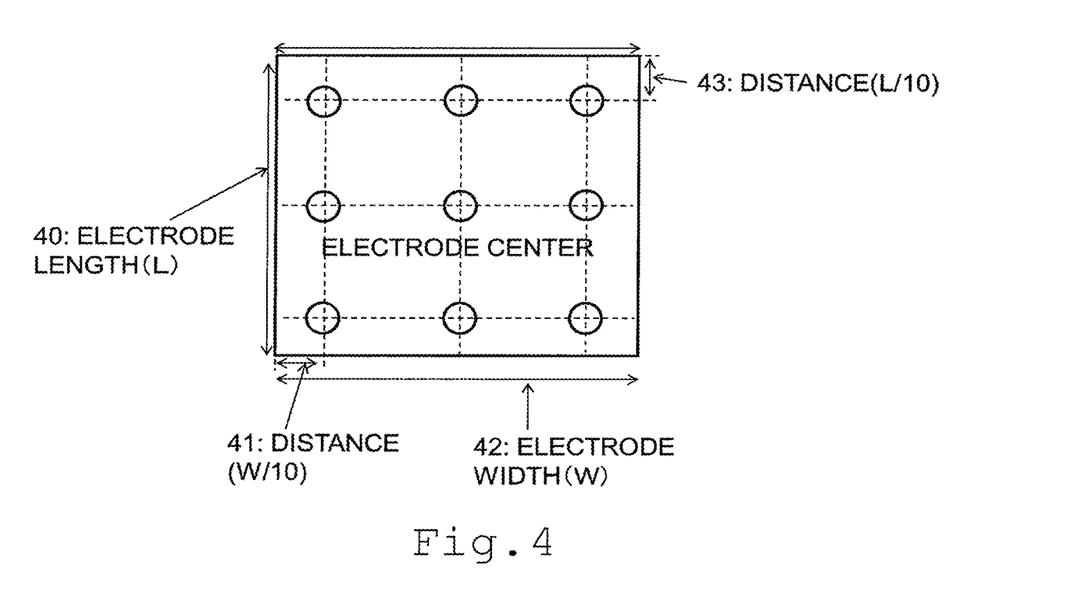
FIG. 4 is a view showing measurement spots on the electrode according to the embodiment.

First, nine-spot samples were cut out from the MEA 100. Nine spots were specified within the surface of the catalyst layer shown in FIG. 4, and an average value of the thicknesses of the catalyst layer in the nine spots was taken as an average catalyst layer thickness of the electrode. Each of the spots has a region of at least 5 mm$^2$ in a square shape. It is set that, when an electrode length (L) 40 and an electrode width (W) 42 are L≥W, a distance 41 is W/10, and a distance 43 is L/10. Samples were cut out from the centers of the nine-spot samples to prepare TEM observation samples. For making the interface between the electrolyte membrane 4 and the first catalyst layer 3 easy to observe, the samples were soaked into 0.1 M to 1 M of a Ru-ionic solution to be pretreated.

Subsequently, in each of the nine sports of the MEA 100, three places per spot were observed using a transmission electron microscope (TEM). A TEM image with a magnification of 15400 was obtained, and from its contrast, the catalyst material, the electrolyte membrane, an ionomer, and pores are distinguished. Note that the imaging range was set to 12 μm×9.5 μm.

Finally, the catalyst layer thickness was measured in each field of view. Here, the "catalyst layer thickness" means as follows: an average value of measured values in all fields of view in each of the above samples were defined as the catalyst layer thickness of the MEA 100. Based on the catalyst layer thickness as thus obtained, the porosity of the catalyst layer was obtained as: 1−(thickness corresponding to platinum amount)/(catalyst layer thickness).

<Penetration Ratio of Electrolyte Membrane 4 into First Catalyst Layer>

A penetration ratio of the electrolyte membrane 4 into the first catalyst layer 3, which is the depth of the electrolyte membrane 4A existing among the first catalyst units 31 in the first catalyst layer 3, is obtained by the above TEM image observed with a magnification of 155000. Three places per spot were observed using the TEM in each of the nine spots of the MEA 100. Note that the imaging range was set to 1.2 μm×0.95 μm.

Figure 5:
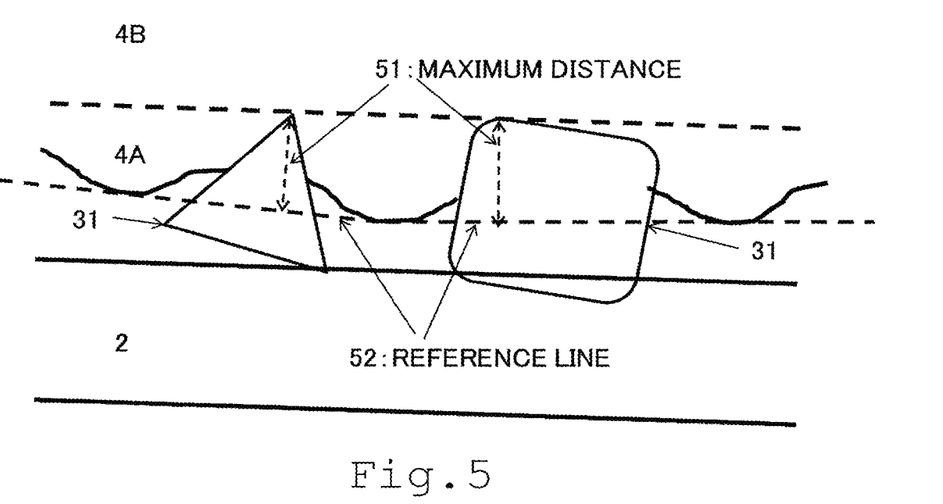
FIG. 5 is a sectional explanatory view of an interface of the gas diffusion electrode with the electrolyte (layer) according to the embodiment.

As shown in a sectional explanatory view of the membrane electrode assembly (a sectional explanatory view of the gas diffusion electrode with the electrolyte (layer)) of FIG. 5, a coupling line of intersections between the catalyst units 31 and the electrolyte membrane 4A is referred to as a reference line 52. The reference line 52 is a line that couples line segments connecting contacts with the electrolyte membrane 4A. Angles of the coupled line segments are different as shown in FIG. 5. Further, the reference line 52 is set so as to pass the outer circumference of the electrolyte membrane 4A between the first catalyst units 31 and have the shortest distance to the first base 2. A distance of a normal from the reference line 52 having the longest distance to the interface between the catalyst unit 31 and the electrolyte membrane 4, which is a maximum distance 51 among distances from the respective points on the interfaces between the catalyst units 31 on the electrolyte membrane 4 side and the electrolyte membrane 4 to the reference line 42, is defined as a depth (entry depth) of the electrolyte membrane 4A existing among the first catalyst units 31 in the first catalyst layer 3.

By taking an average value of measured values in three places in each of the nine spots of the MEA 100, it is possible to obtain an average value of depths of the electrolyte membrane 4A existing among the first catalyst units 31 in the first catalyst layer 3. There are often cases where a plurality of catalyst units are continued (a catalyst unit group) and the penetration of the catalyst units inside the group cannot be specified by TEM observation. In this case, the penetration depth of the outer catalyst unit of the group was employed as a representative value of all the units in the group.

Similarly to the depth of the electrolyte membrane 4A existing among the plurality of first catalyst units 31 in the first catalyst layer 3, it is also possible to obtain from the TEM image in what percentage of a space among the first catalyst units 31, the electrolyte membrane 4A among the first catalyst units 31 exists over a region being at least of the thickness of the first catalyst layer 3 from the surfaces of the first catalyst units 31, which are in direct contact with the electrolyte membrane 4B on the opposite side from the first base 2 side, toward the first base 2. Next, a ratio of the catalyst unit 31 whose penetration ratio is at least 80% of the thickness of the first catalyst layer 3 in each spot is obtained. The obtained ratio is the penetration distribution. Averages of the penetration ratio in three places of each spot is obtained. An average of catalyst penetration ratio and an average of catalyst penetration distribution in each spot is obtained by using values of the averages of the penetration ratio in three places of each spot. An average of catalyst penetration ratio of MEA 100 (entry ratio (%)) and an average of penetration distribution of MEA 100 (entry distribution (%)) are obtained by using values of the averages of all spots in each sample.

Figure 6:
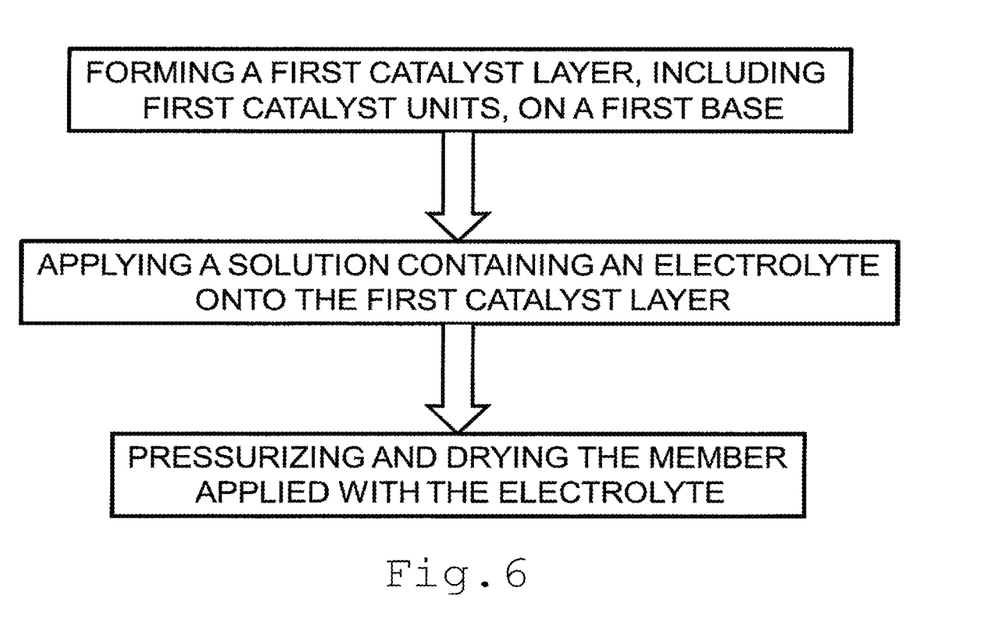
FIG. 6 is a chart showing preparation processing according to the embodiment.

Next, a method for preparing the MEA 100 according to the embodiment will be briefly described. The method for preparing the MEA 100 according to the embodiment has the steps of: forming the first catalyst layer 3 that includes the catalyst units 31 on the first base 2; applying a solution containing an electrolyte onto the first catalyst layer 3; and pressurizing and drying the member applied with the electrolyte. FIG. 6 shows a chart for the method for preparing the MEA 100 according to the embodiment.

First, when the first catalyst layer 3 including the first catalyst units 31 is to be prepared, a catalyst layer precursor is formed on the first base 2 by simultaneously or alternately sputtering or vaporizing a catalyst material and a pore-forming agent material. Subsequently, the pore-forming agent is removed to obtain an electrode. When the first catalyst layer 3 including the first catalyst units 31 is to be prepared, in the case of simultaneously forming the catalyst material and the pore-forming agent material, the catalyst units 31 with the catalyst material in a spongy form are obtained. When the first catalyst layer 3 including the catalyst units 31 is to be prepared, in the case of alternately forming the catalyst material and the pore-forming agent material, the first catalyst units 31 with the catalyst material having a sheet-like laminated structure are obtained.

Subsequently, the electrolyte membrane 4 is formed on the first catalyst layer 3. The electrolyte membrane 4 is prepared by applying an electrolyte dispersed solution onto the first catalyst layer 3 of the electrode, and heating and drying the solution. The electrolyte dispersed solution may be any solution obtained by dispersing an electrolyte into a solvent, with any concentration that allows the application. Examples of the solvent include water, alcohol solvents such as methanol, ethanol, isopropanol, 1-propanol, and ethylene glycol, ether solvents such as tetrahydrofuran and dimethoxyethane, and aprotic polar solvents such as N,N-dimethylformamide and N,N-methyl pyrrolidone. However, the solvent to be used is not restricted thereto. Further, a mixed solvent of a variety of solvents may be used for the dispersed solvent. A solute is any one or more of the group consisting of: fluororesin having a sulfonate group, tungstic acid, and phosphotungstic acid.

Examples of an application method include spin coating, blade coating, ink jetting, rotogravure, spray coating, and the like. However, the application method is not restricted thereto. The applied electrolyte is heated and dried to prepare the electrolyte membrane 4.

As for the application, dispersed solutions with different concentrations may be applied, or those with different electrolyte compositions may be laminated. Further, the electrolyte membrane 4 can similarly be formed by applying, into the electrolyte dispersed solution, a dispersed solution added with hydrogen peroxide such as a metal oxide or a radical supplementary agent made up of a radical decomposition agent and an organic component, so as to improve the durability of the membrane.

The heating and drying at the time of forming the electrolyte membrane may be performed during the application or after the application, or may be performed both during and after the application. In any case, pressurization, heating, and drying are performed before the drying. The heating temperature depends on the solvent and the electrolyte in use, but is preferably from 30° C. to not higher than 300° C. Further, performing the pressurization, heating, and drying by hot press has a large effect on the entry depth of the electrolyte in the uneven interface of the catalyst layer (the first catalyst layer 3 and voids therein). With the structure of the catalyst layer and the characteristics of the electrolyte, it is possible to optimize pressure, a temperature, and drying time.

A device for pressurization and heating may be a hot press, a roller, or the like, but it is not restrictive. For example, in the case of using the hot press, it is preferable that pressure to be applied to the first catalyst layer 3 from the surface applied with the electrolyte be not smaller than 0.5 kg/cm$^2$ and not larger than 100 kg/cm$^2$, the temperature be not lower than 80° C. and not higher than 200° C., and the processing time for pressurization and drying be in the range of not shorter than 20 seconds and not longer than 3600 seconds.

Second Embodiment

Figure 7:
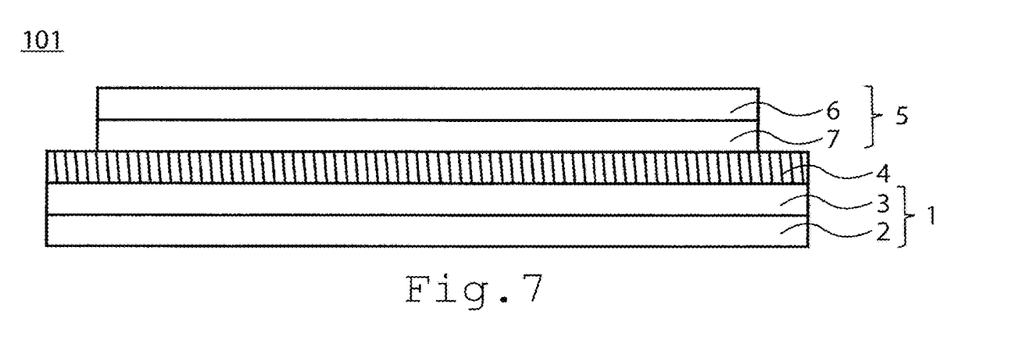
FIG. 7 is a sectional view of a membrane electrode assembly according to an embodiment.

A second embodiment is a membrane electrode assembly 101 further having a second electrode. FIG. 7 is a sectional view of the membrane electrode assembly of the second embodiment. The membrane electrode assembly 101 of FIG. 7 has the first electrode 1 including the first base 2 and the first catalyst layer 3, the electrolyte membrane 4, and a second electrode 5 including a second base 6 and a second catalyst layer 7.

When the membrane electrode assembly 101 is to be used for a fuel cell, the second electrode 5 preferably has the same configuration as that of the first electrode 3. When the membrane electrode assembly 101 is to be used in water electrolysis, an oxide catalyst containing iridium is preferably used for the second electrode 5.

When the MEA 101 is used for the fuel cell, the second catalyst layer 7 in the second electrode 5 preferably includes a plurality of second catalyst units. The electrolyte membrane 4 is preferably in direct contact with both the surfaces (first surfaces) of the second catalyst units facing with each other among the second catalyst units, and the surfaces (second surfaces) of the second catalyst units on the opposite side from the second base 6 side. It is preferable to include a portion where the electrolyte membrane 4 among the second catalyst units exists over a region being at least 80% of the thickness of the second catalyst layer 7 from the surfaces of the second catalyst units, which are in direct contact with the electrolyte membrane 4 on the opposite side from the second base 6 side, toward the second base 6. The second base 6 is preferably a gas diffusion base. It is preferable that an average depth of the electrolyte membrane 4 existing among the second catalyst units be not less than 75% of the thickness of the second catalyst layer 7 from the surfaces of the second catalyst units, which are in direct contact with the electrolyte membrane 4 on the opposite side from the second base 6 side, toward the second base 6. It is preferable that in not less than 60% of a space among the second catalyst units, the electrolyte membrane 4 among the second catalyst units exist over a region being at least 80% of the thickness of the second catalyst layer 7 from the surfaces of the second catalyst units, which are in direct contact with the electrolyte membrane 4 on the opposite side from the second base 6 side, toward the second base 6.

The other preferable conditions and measurement methods in the second electrode are in common with those in the first electrode 3.

It is preferable from the viewpoint of preventing a leakage that an outer circumference of the first electrode 3 exist more outside than an outer circumference of the second electrode 5 by not less than 1 mm and not more than 50 mm. Further, in the MEA 101, an area of the electrolyte membrane 4 is preferably not larger than an area of the electrode having a larger area, or larger than an area of the electrode having a smaller area. This is because, when the area of the electrolyte membrane becomes larger than the area of the larger electrode, the mechanical strength of the interface between the electrolyte membrane portion and the electrode decreases, and when the area of the electrolyte membrane becomes smaller than the area of the smaller electrode, a leakage occurs between the anode electrode and the cathode electrode.

It is preferable that the second electrode 5 be formed before or after the pressurizing and heating treatment at the time of preparing the MEA of the first embodiment, and the second electrode 5 be prepared by the pressurizing and heating treatment as in the first embodiment.

Third Embodiment

A third embodiment relates to a sub-gasket-integrated membrane electrode composite. In the third embodiment, a sub-gasket (gasket) is joined to a portion between the electrode ends of the MEA 101. The gasket is located between the membrane electrode assembly (MEA) and a current collector where a channel for fuel supply or oxidant supply is disposed. The gasket is used for sealing to prevent leakage of the fuel and oxidant. The sub-gasket is used for adjustment of the electrolyte and the gasket, to supplement the gasket more, and is used between the MEA 101 and the gasket.

Materials for the sub-gasket and the gasket may not be the same.

Figure 8:
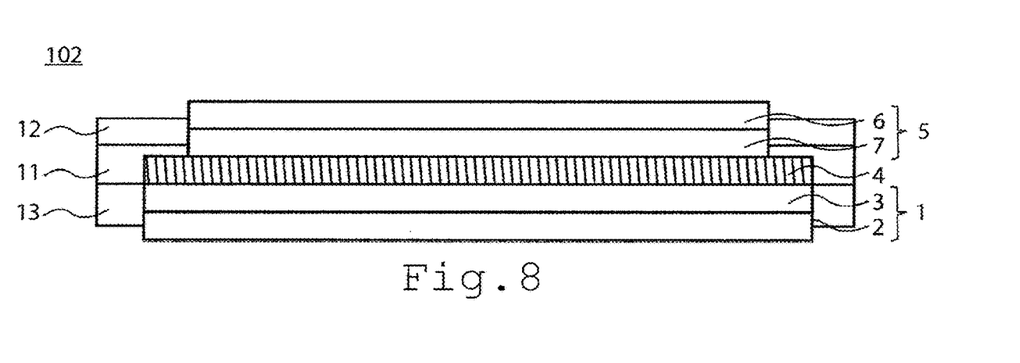
FIG. 8 is a sectional view of a sub-gasket-integrated membrane electrode assembly according to an embodiment.

FIG. 8 shows a sectional view of a sub-gasket-integrated membrane electrode composite 102. This is a view where sub-gaskets or gaskets 12, 13 are joined via an adhesive 11 so as to cover a gap between the end of the first electrode 3 and the end of the second electrode 5 in the MEA 101.

A method for preparing the sub-gasket-integrated membrane electrode composite 102 includes the steps of: forming the first catalyst layer 3 that includes the catalyst units 31 on the first base 2; applying a solution containing an electrolyte onto the first catalyst layer 3; pressurizing and drying the member applied with the electrolyte; forming the second electrode 5 on the electrolyte membrane 4; and integrating the sub-gaskets or gaskets 12, 13 to the electrode ends of the membrane electrode assembly 101 via the adhesive 11.

Examples of the sub-gaskets 12, 13 include polyvinylidene fluoride (PVdF), polyethylene, cyclic polyolefin (COP), polyethylenenaphthalate (PEN), and the like. However, the sub-gaskets 12, 13 are not restricted thereto. Further, as the adhesive 11 for joining the sub-gaskets 12, 13 and the MEA 101, there may be used a material obtained by forming a thermoplastic resin (hot melt material) or reactive resin into a film form, or a material directly applied to the sub-gaskets 12, 13. As a melting point of the thermoplastic resin, there is used a temperature not lower than a temperature used in the electrochemical cell. Examples of the thermoplastic resin include polyolefin, polyester, polyamide, and polyurethane resin, polyvinyl acetate-ethylene copolymer, and the like. However, the thermoplastic resin is not restricted thereto. Its thickness is optimized by the electrode thickness.

The membrane electrode assemblies 100, 101, 102 in the present embodiment can each be an electrolyte cell, or a micro electro mechanical systems (MEMS)-type electrochemical cell. For example, the electrolyte cell can be configured in the same manner as the foregoing fuel cells except for including an oxygen generating catalyst electrode as the first electrode 3 in place of the anode.

It is also possible to control the entry of the electrolyte membrane among the catalyst units by assembly of the cell, such as cramping pressure in a vertical direction to the MEA 101.

Fourth Embodiment

Figure 9:
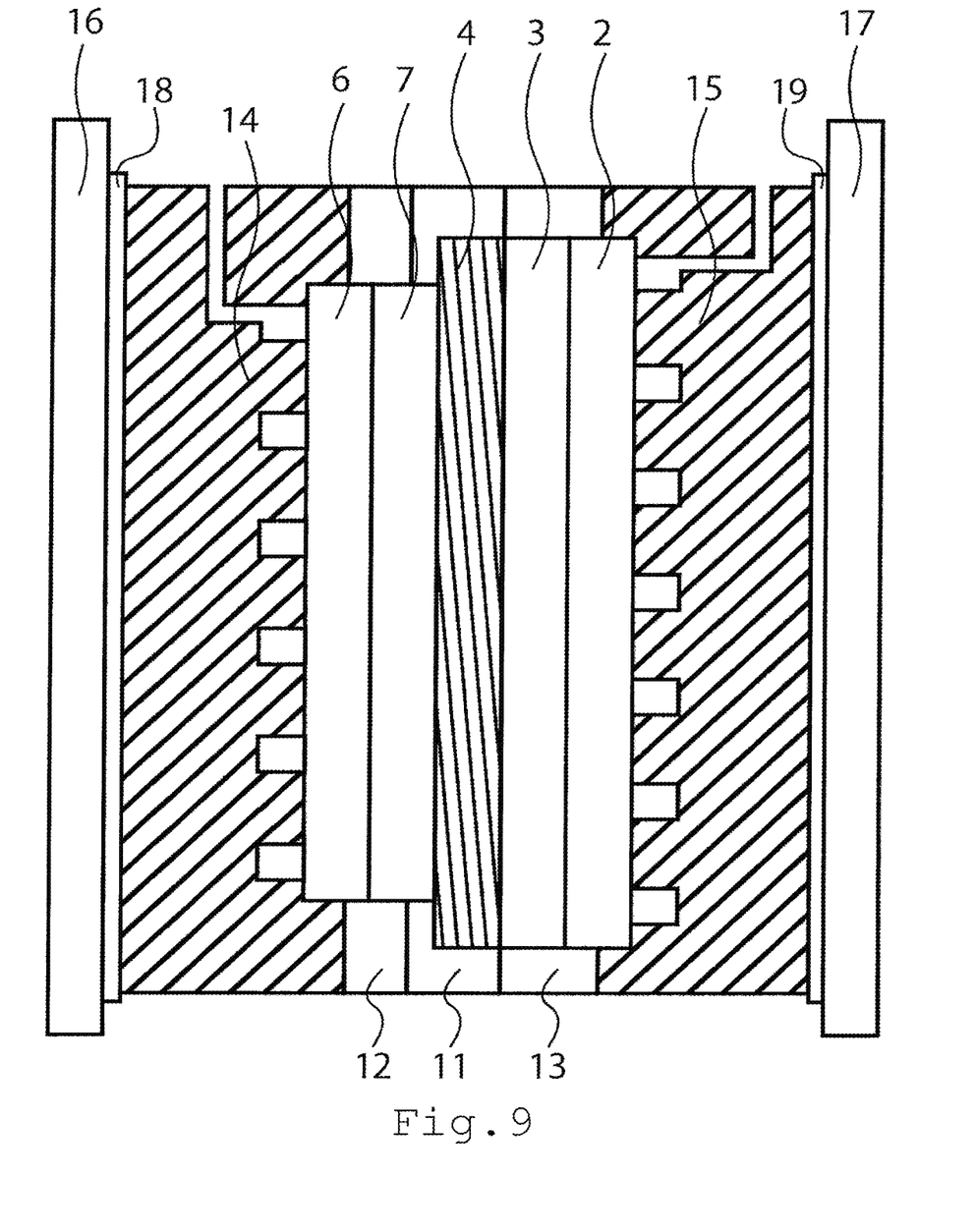
FIG. 9 is a sectional view of an electrochemical cell according to an embodiment.

A configuration of an electrochemical cell according to the present embodiment will be briefly described using a sectional view of an electrochemical cell 200 of FIG. 9. In the electrochemical cell 200 shown in FIG. 9, current collectors 14, 15 with fuel and oxidant supply channels, and clamp plates 16, 17, are mounted on both sides of the MEA 101 via the adhesive 11 and the gaskets 12, 13. Insulating films 18, 19 are provided between the current collectors 14, 15 with the fuel and oxidant supply channels and the clamp plates 16, 17.

Fifth Embodiment

Figure 10:
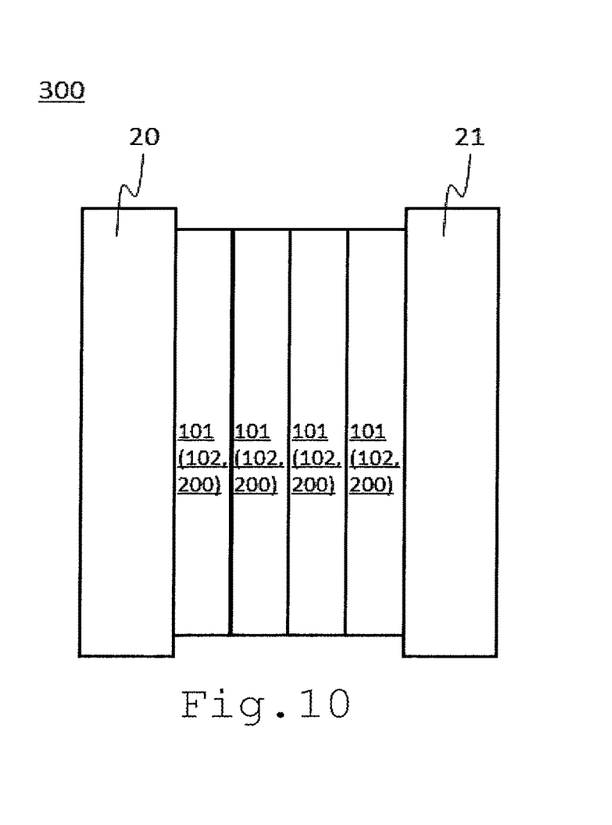
FIG. 10 is a sectional view of a stack according to an embodiment.

A configuration of a stack according to the present embodiment will be briefly described using a sectional view of a stack 300 of FIG. 10. The stack 300 has a configuration where a plurality of membrane electrode assembly 101 or 102 or electrochemical cells 200 are connected in series. Cramp plates 20, 21 are mounted on both ends of the membrane electrode assemblies 101 or 102, or the electrochemical cells 200.

Sixth Embodiment

Figure 11:
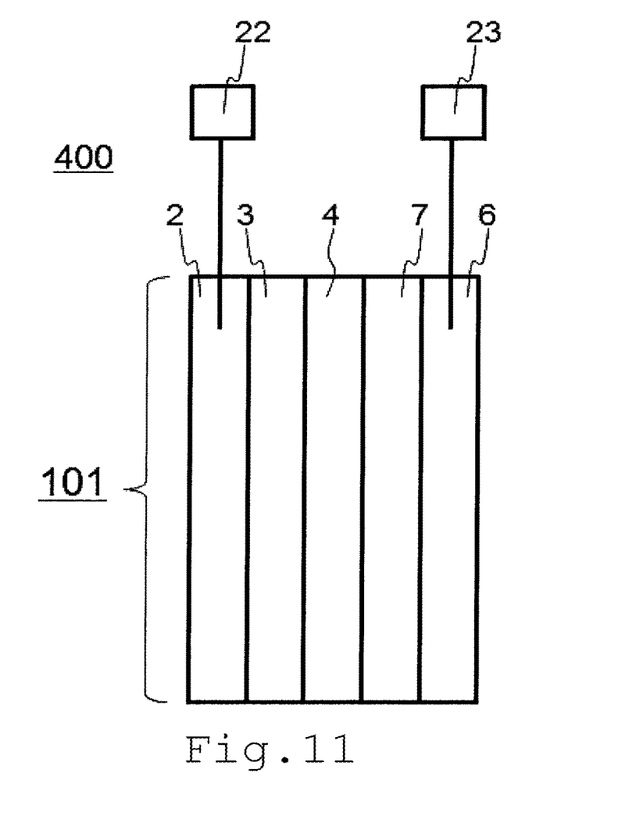
FIG. 11 is a sectional view of a fuel cell according to an embodiment.

A configuration of a fuel cell according to the present embodiment will be briefly described using a sectional view of the fuel cell of FIG. 11. A fuel cell 400 includes the membrane electrode assembly 101 or 102, a fuel supply unit 22, and an oxidant supply unit 23. Electrodes in the membrane electrode assembly 101 or 102 used for the fuel cell 400 are a fuel electrode 3 and an oxidation electrode 7. The electrochemical cell 200 or the stack 300 may be used in place of the membrane electrode assembly 101 or 102.

Seventh Embodiment

Figure 12:
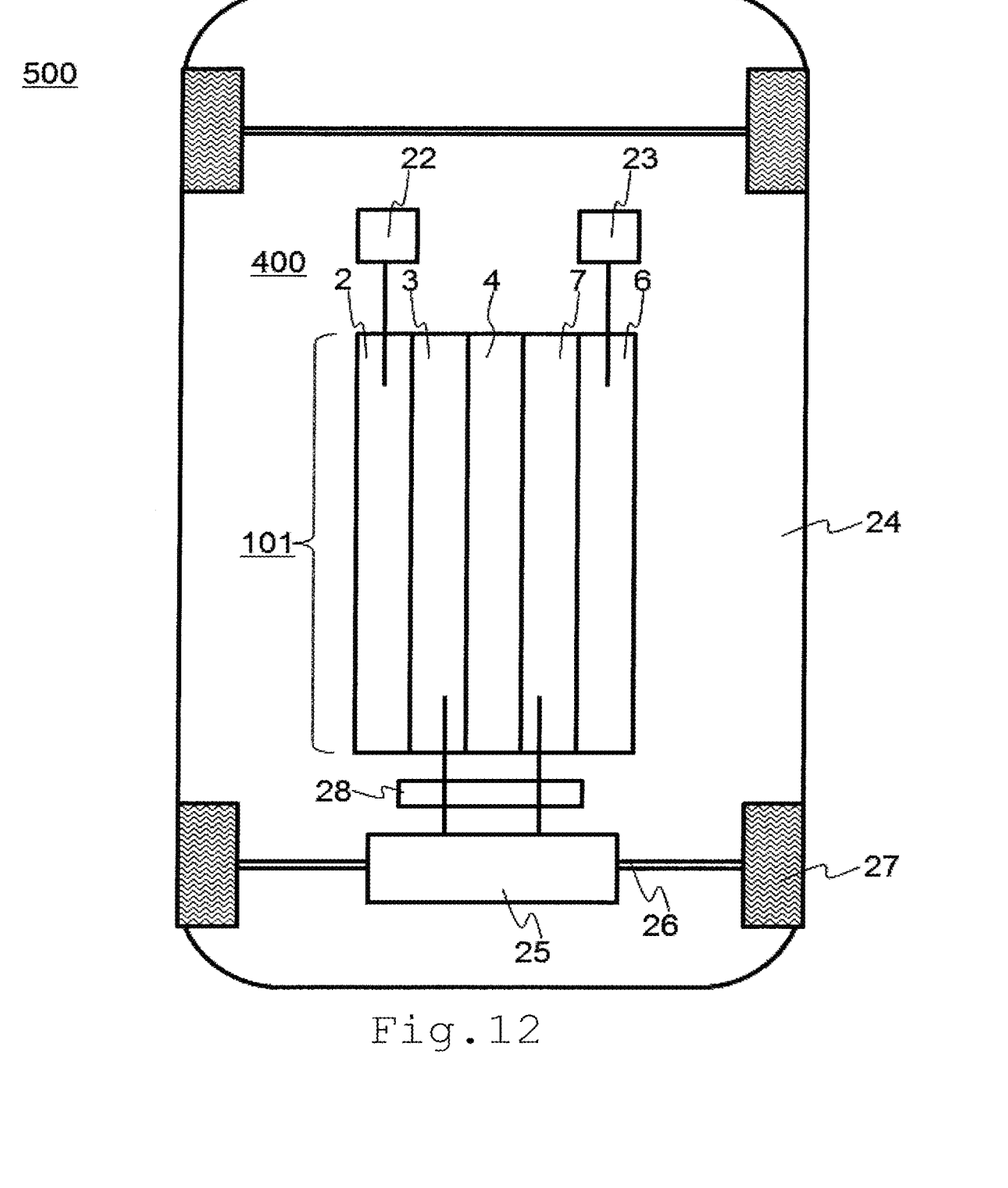
FIG. 12 is a schematic view of a vehicle according to an embodiment.

A configuration of a vehicle according to the present embodiment will be briefly described using a schematic view of a vehicle 500 of FIG. 12. The vehicle 500 includes the fuel cell 400, a body 24, a motor 25, an axle 26, wheels 27, and a load control unit 28. The fuel electrode 3 and the oxidation electrode 7 of the fuel cell 400 are connected with the motor 25 being a load via the load control unit 28. The motor rotates the axle 26 connected with the wheels 27 to rotate the wheels 27. The fuel cell of an embodiment can be also used as power source for flying object, such as a drone.

EXAMPLES

Hereinafter, examples and comparative examples will be described.

Table 1 provides a summary of results of observation on catalyst layers, electrodes, and interfaces between the catalyst layers and electrolyte membranes, and evaluation results of electrochemical cells, and the like in Examples 1 to 10 and Comparative Examples 1 to 5 prepared in the following conditions. With the catalyst layer being support-less, a porosity of the catalyst layer was obtained from a ratio between a thickness corresponding to a platinum loading amount of a catalyst and a catalyst layer thickness. Following Table 1 shows electrode of the anode and cathode in examples. In examples 1-5 and comparative example 1-3, anodes are manufactured. in examples 1-5 and comparative example 1-3, cathodes are manufactured. Each manufactured electrode numbers are named as AE1-5、BAE1-3 、CE1-5, and BCE4-5. In comparative examples 1, 2, and 4, electrolyte membrane is not pasted. In comparative examples 1, 2, and 4, the electrolyte membrane has no thickness, entry ratio (%), entry distribution (%), and pressurization/thermal drying are not listed. In comparative example 3 and 5, pressurizing, heating, and drying after heating and drying at 60° C. for ten minutes are not processed. Specific manufacturing processes for electrodes are show below the table 1. Penetration ratio of electrolyte membrane into first catalyst layer is expressed by entry ratio (%), Entry distribution (%) is also shown in Table 1.

TABLE 1A

| | Electrode Number | Electrode size | Catalyst layer Porosity (%) | Thickness (μm) of electrolyte membrane (layer) |
| --- | --- | --- | --- | --- |
| Anode | | | | |
| Example 1 | AE1 | 5.40 cm × 5.40 cm | 75.8 | 5 |
| Example 2 | AE2 | 5.40 cm × 5.40 cm | 85.1 | 13 |
| Example 3 | AE3 | 5.00 cm × 5.00 cm | 89.5 | 14 |
| Example 4 | AE4 | 5.40 cm × 5.40 cm | 83.5 | 24 |
| Example 5 | AE5 | 5.00 cm × 5.00 cm | 87.5 | 23 |
| Comparative Example 1 | BAE1 | 5.40 cm × 5.40 cm | 85.1 | None |
| Comparative Example 2 | BAE2 | 5.00 cm × 5.00 cm | 87.5 | None |
| Comparative Example 3 | BAE3 | 5.40 cm × 5.40 cm | 75.8 | 14 |
| Cathode | | | | |
| Example 6 | CE1 | 5.00 cm × 5.00 cm | 81.7 | 5 |
| Example 7 | CE2 | 5.00 cm × 5.00 cm | 85.1 | 13 |
| Example 8 | CE3 | 5.40 cm × 5.40 cm | 89.5 | 14 |
| Example 9 | CE4 | 5.00 cm × 5.00 cm | 83.5 | 24 |
| Example 10 | CE5 | 5.40 cm × 5.40 cm | 88.2 | 23 |
| Comparative Example 4 | BCE4 | 5.00 cm × 5.00 cm | 87.5 | None |
| Comparative Example 5 | BCE5 | 5.00 cm × 5.00 cm | 75.8 | 14 |

TABLE 1B

| | Entry ratio (%) | Entry distribution (%) | Pressurization/ Thermal drying |
|---|---|---|---|
| Anode | | | |
| Example 1 | 83 | 78 | 1 kg/cm², 130° C. |
| Example 2 | 90 | 85 | 1 kg/cm², 145° C. |
| Example 3 | 96 | 88 | 1 kg/cm², 130° C. |
| Example 4 | 88 | 82 | 2 kg/cm², 130° C. |
| Example 5 | 92 | 85 | 2 kg/cm², 145° C. |
| Comparative Example 1 | — | — | — |
| Comparative Example 2 | — | — | — |
| Comparative Example 3 | 65 | 45 | None |
| Cathode | | | |
| Example 6 | 81 | 76 | 1 kg/cm², 130° C. |
| Example 7 | 89 | 84 | 1 kg/cm², 145° C. |
| Example 8 | 93 | 85 | 1 kg/cm², 130° C. |
| Example 9 | 85 | 82 | 2 kg/cm², 130° C. |
| Example 10 | 92 | 87 | 2 kg/cm², 145° C. |
| Comparative Example 4 | — | — | — |
| Comparative Example 5 | 59 | 43 | None |

<Preparation of Electrode Having Support-less Catalyst Layer, and Membrane Electrode Composite>

(Electrode Preparation of Anode for Fuel Cell)

As a substrate, carbon paper Toray 060 (manufactured by Toray Industries, Inc.) having a micro porous layer (MPL) with a thickness not smaller than 1 μm and not larger than 50 μm was prepared. On this substrate, a catalyst layer was formed which was made up of units having a porous structure by sputtering such that a loading density of a Pt catalyst was 0.05 mg/cm², to obtain a diffusion layer electrode having a support-less porous laminated catalyst layer. As a catalyst amount, a Pt supporting amount was set to 0.05 mg/cm².

About 6.5% of a solution, obtained by diluting 20%-Nafion dispersed solution (manufactured by Du Pont) with ethanol, was applied by spraying onto the catalyst layer of the electrode, which was heated and dried at 60° C. for ten minutes and then pressurized, heated, and dried for 20 minutes, to obtain a gas diffusion electrode with an electrolyte membrane. This electrode was formed into a square of 5.40×5.40 cm or 5.00×5.00 cm, and then used as anodes of Examples 1, 2, 4, and 5 and Comparative Example 3. Further, an electrode of Example 3 was prepared by diluting a 20%-Nafion solution with ethanol to prepare a 0.5%-Nafion dispersed solution and a 7%-Nafion dispersed solution, and applying the 0.5%-Nafion dispersed solution, followed by the 7%-Nafion dispersed solution. These results were summarized in Table 1.

(Electrode Preparation of Cathode for Fuel Cell)

As a substrate, carbon paper Toray 060 (manufactured by Toray Industries, Inc.) having a carbon layer with a thickness of 1 μm to 50 μm on the surface was prepared. On this substrate, a platinum catalyst layer was formed which was made up of units having a porous structure or a laminated structure including void layers by sputtering, to obtain an electrode having a support-less porous catalyst layer (a platinum loading amount of 0.18 mg/cm²). In the sputtering, the process was adjusted such that values of the form of the catalyst layer unit and the thickness of the catalyst layer become values shown in Table 1 above. These electrodes were each formed into a square of 5.00×5.00 cm or 5.40× 5.40 cm, to form electrodes of Examples 6, 7, 9, and 10, and Comparative Example 5, which were summarized in Table 1.

(Preparation of Membrane Electrode Assembly (MEA))

The anode electrodes with the electrolyte membranes prepared above were each cut into a 54 mm square. Further, the prepared cathode electrode was cut into a 50 mm square. A SUS plate (100 mm square, 1 mm thickness), a silicon rubber sheet (100 mm square, 2 mm thickness), a PTFE film (100 mm square, 200 μm thickness), an anode electrode, a cathode electrode, a PTFE film, a silicon rubber sheet, and a SUS plate were laminated in this order, which were press-fit by hot press (0.3 ton, 165° C., four minutes) and then cooled down, to prepare a MEA using actual electrodes.

Meanwhile, as the sub-gasket, a PEN film (38 μm thickness; Q51-38) manufactured by Teijin-Du Pont film Solutions Limited was cut into a 75 mm square, the inside of which was then cut into 54.5 mm square (to form a 54 mm-square electrode-side sub-gasket). Next, the above PEN film cut into a 75 mm square was laminated with a 75 mm-square polyamide hot melt film (manufacture by Nihon Matai Co., Ltd., NT-12, 50 μm thickness) having a melting point of 140° C., and press-fit at 130° C. with 2 kg for two minutes. The inside of the PEN film laminated with the hot melt sheet was cut into a 50.5 mm square (to form a 50 mm-square electrode-side sub-gasket).

The prepared sub-gasket was put together with the inside cut portions of the MEA and the sub-gasket, which were press-fit at 130° C. with a press of 60 kg for three minutes similarly to the above MEA, to prepare the sub-gasket-integrated membrane electrode assembly of each of Examples 11 to 17.

As Comparative Example 7, there was prepared a MEA using an electrode with an electrolyte membrane not pressurized or dried, without using a sub-gasket. As Comparative Example 8, there was prepared a MEA using an electrode with an electrolyte membrane not pressurized or dried as in Comparative Example 7, and integrated with a sub-gasket.

(Evaluation of Power Generation Performance of Fuel Cell)

As a fuel-cell evaluation cell, a 25 cm²-unit cell (an anode was a serpentine channel and a cathode was an interdigitated channel) was used. The MEA was set in the fuel-cell evaluation cell by using PTFE films as anode-side and cathode-side gaskets. Further, the obtained fuel-cell MEA was set between two separators provided with channels to prepare a unit cell (electrochemical cell) of a polymer electrolyte fuel cell.

Using the prepared unit cell, each MEA was evaluated on the following items.

(Cell Voltage Evaluation)

The obtained unit cell was conditioned for one day. Thereafter, the unit cell was kept at 80° C., and hydrogen was supplied to the anode as a fuel while oxygen was supplied to the cathode. A flow rate of hydrogen was 0.6 L/min and a flow rate of oxygen was 0.3 L/min. A relative humidity of each of hydrogen and air was 100%. Along with the supply of hydrogen and oxygen, a current density was fixed to 1 A/cm² and discharge was performed. A cell voltage (V) was measured after five minutes, which was summarized in Table 2. Table 2 shows numbers of used anodes and cathodes (refer to Table 1) and numbers of manufactured MEA. Excluding comparative example 6, electrolyte membrane was formed by pasting and drying on anode and/or cathode. In comparative example 6, nafion membrane (Nafion 211) was sandwiched between anode and cathode, and MEA was manufactured. In addition to the cell voltage, membrane resistance (Resistance mΩ) was obtained by alternating current impedance method (1 kHz), and is shown in Table 2.

TABLE 2A

|  | MEA number | Anode number | Cathode number | Electrolyte membrane |
|---|---|---|---|---|
| Example 11 | MEA1 | AE1 | CE1 | Applied film |
| Example 12 | MEA2 | AE2 | CE2 | Applied film |
| Example 13 | MEA3 | AE3 | CE3 | Applied film |
| Example 14 | MEA4 | AE4 | CE4 | Applied film |
| Example 15 | MEA5 | AE4 | BCE4 | Applied film |
| Example 16 | MEA6 | BAE1 | CE5 | Applied film |
| Example 17 | MEA9 | AE5 | CE5 | Applied film |
| Comparative Example 6 | MEA10 | BAE2 | BCE4 | Nafion 211 |
| Comparative Example 7 | MEA11 | BAE3 | BCE5 | Application |
| Comparative Example 8 | MEA12 | BAE3 | BCE5 | Application |

TABLE 2B

|  | Integrated with sub-gasket | Cell voltage with current density of 1 A/cm$^2$ | Resistance (mΩ) |
|---|---|---|---|
| Example 11 | Yes | 0.665 | 2.4 |
| Example 12 | Yes | 0.667 | 3.2 |
| Example 13 | Yes | 0.68 | 2.9 |
| Example 14 | Yes | 0.66 | 3.6 |
| Example 15 | Yes | 0.678 | 3.1 |
| Example 16 | Yes | 0.68 | 3.1 |
| Example 17 | Yes | 0.662 | 3.65 |
| Comparative Example 6 | No | 0.651 | 4.3 |
| Comparative Example 7 | None | Could not measured | 3.3 |
| Comparative Example 8 | Yes | 0.615 | 3.3 |

As shown in Table 2 above, in each of the MEAs of Examples 11 to 17, an average entry ratio of the electrolyte in to the catalyst unit is not less than 80°. The cell characteristic of each example was a voltage of 0.66 to 0.68, indicating that the performance of the MEA of each example was equivalent to or higher than that of the MEA of Comparative Example 6 using Nafion 211 which is a conventional, commercially available electrolyte membrane. As shown in Table 2, it is considered that in each example, the entry ratio of the electrolyte to the catalyst layer increases due to reduction in resistance value, thereby decreasing the interface resistance to improve the performance.

According to at least one embodiment described above, by control of an interface between a catalyst layer and an electrolyte membrane layer of a membrane electrode composite including a support-less catalyst layer, it is possible to provide a membrane electrode composite and a sub-gasket-integrated membrane electrode composite, having a high cell voltage and high robustness and durability, with a small amount of noble metal. Further, a fuel cell using such a membrane electrode assembly is excellent in power generation characteristics.

Here, some elements are expressed only by element symbols thereof.

While certain embodiments have been described, these embodiments have been presented by way of example only, and are not intended to limit the scope of the inventions. As the electrochemical cell, the unit cell of the polymer electrolyte fuel cell having a hydrogen fuel has been cited. However, the disclosure is also applicable to electrochemical cells other than the above unit cell, such as a methanol fuel cell and a polymer electrolyte water electrolysis cell where ions move or a material such as water moves through an electrolyte membrane or a diaphragm. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A membrane electrode assembly, comprising:
a first electrode having a first base, and a first catalyst layer provided on the first base, the first catalyst layer including a plurality of first catalyst units with a laminated structure, and the laminated structure including void layers; and
an electrolyte membrane being in direct contact with both first surfaces of the first catalyst units facing each other among the first catalyst units, and second surfaces of the first catalyst units on the opposite side from the first base side,
wherein a portion is included where the electrolyte membrane exists over a region being at least 80% of a thickness of the first catalyst layer from the second surfaces of the first catalyst units toward the first base, and
an average depth of the electrolyte membrane existing among the first catalyst units is not less than 75% of the thickness of the first catalyst layer from the second surfaces of the first catalyst units toward the first base.

2. The assembly according to claim 1, wherein the first base is a gas diffusion base.

3. The assembly according to claim 1, wherein the electrolyte membrane includes any one or more selected from the group consisting of: fluororesin having a sulfonate group, tungstic acid, and phosphotungstic acid.

4. The assembly according to claim 1, wherein in not less than 60% of a space among the first catalyst units, the electrolyte membrane among the first catalyst units exists over a region being at least 80% of the thickness of the first catalyst layer from the second surfaces of the first catalyst units toward the first base.

5. The assembly according to claim 1, further comprising:
a second electrode having a second base, and a second catalyst layer provided on the second base, the second catalyst layer including a plurality of second catalyst units with a laminated structure, and the laminated structure including void layers,
wherein the electrolyte membrane is in direct contact with both first surfaces of the second catalyst units facing each other among the second catalyst units, and second surfaces of the second catalyst units on the opposite side from the second base side,
a portion is included where the electrolyte membrane among the second catalyst units exists over a region being at least 80% of a thickness of the second catalyst layer from the second surfaces of the second catalyst unit toward the second base,
the second base is a gas diffusion base,
an average depth of the electrolyte membrane existing among the second catalyst units is not less than 75% of the thickness of the second catalyst layer from the second surfaces of the second catalyst units toward the second base, and in not less than 60% of a space among the second catalyst units, the electrolyte membrane among the second catalyst units exists over a region being at least 80% of the thickness of the second catalyst layer from the second surfaces of the second catalyst units toward the second base.

6. The assembly according to claim 5, wherein an outer circumference of the first electrode exists more outside than an outer circumference of the second electrode by not less than 1 mm and not more than 50 mm.

7. The assembly according to claim 1, wherein a portion is included where the electrolyte membrane exists over a region being at least 85% of the thickness of the first catalyst layer from the second surfaces of the first catalyst units toward the first base.

8. The assembly according to claim 1, wherein a portion is included where the electrolyte membrane exists over a region being at least 90% of the thickness of the first catalyst layer from the second surfaces of the first catalyst units toward the first base.

9. The assembly according to claim 1, wherein an average depth of the electrolyte membrane existing among the first catalyst units is not less than 85% of the thickness of the first catalyst layer from the second surfaces of the first catalyst units toward the first base.

10. An electrochemical cell using the membrane electrode assembly according to claim 1.

11. A stack using the membrane electrode assembly according to claim 1.

12. A stack using the electrochemical cell according to claim 10.

13. A fuel cell using the membrane electrode assembly according to claim 1.

14. A fuel cell using the electrochemical cell according to claim 10.

15. A fuel cell using the stack according to claim 12.

16. A vehicle using the fuel cell according to claim 13.

17. A vehicle using the fuel cell according to claim 14.

18. A vehicle using the fuel cell according to claim 15.

* * * * *